Feb. 14, 1967 R. E. MARRS ETAL 3,304,527

MAGNETIC HOLDING AND ALIGNING DEVICE

Filed April 26, 1965

*INVENTORS*

RALPH E. MARRS

DWIGHT W. BREDE

By John H. Holcombe

ATTORNEY

United States Patent Office 3,304,527
Patented Feb. 14, 1967

3,304,527

MAGNETIC HOLDING AND ALIGNING DEVICE

Ralph E. Marrs, Campbell, and Dwight W. Brede, Los Altos Hills, Calif., assignors to International Business Machines Corporation, Armonk, N.Y., a corporation of New York Filed Apr. 26, 1965, Ser. No. 450,704
5 Claims. (Cl. 335—285)

Figures 1, 2:
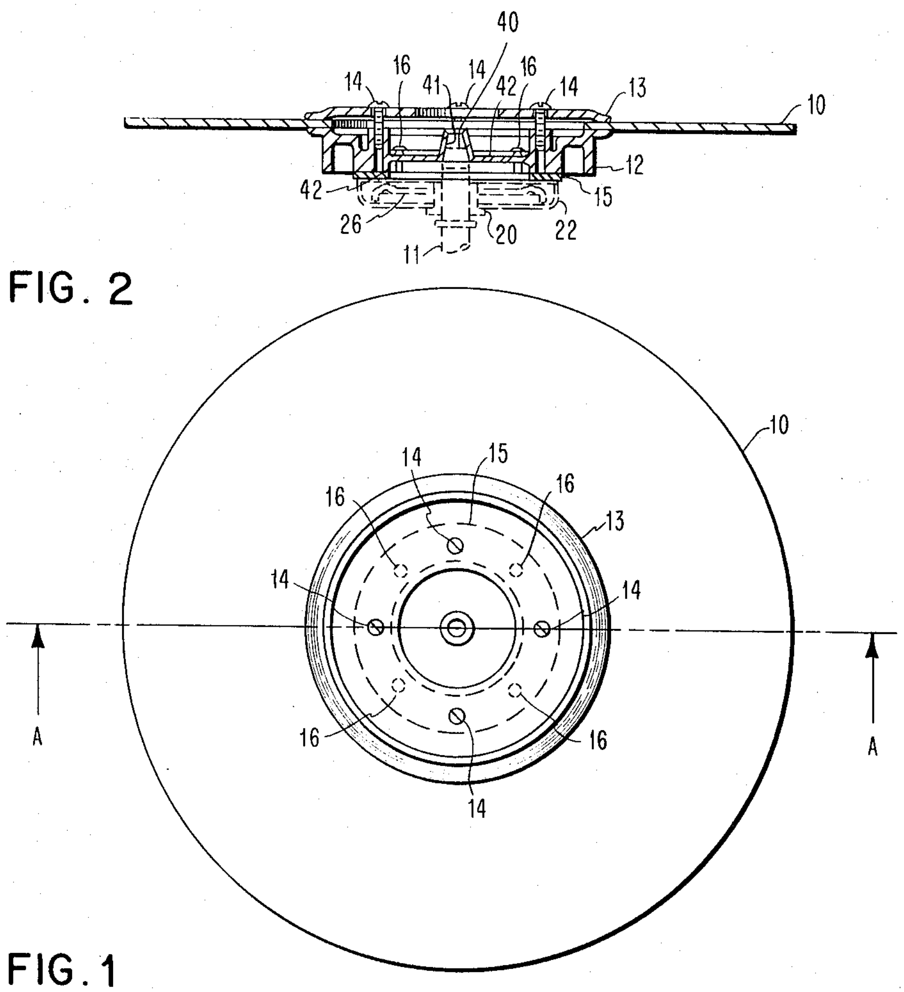

This invention relates to latching holding mechanisms and more particularly to magnetic holding mechanisms for constraining and aligning a detachable member.

There are numerous instances where it is desirable to have a non-slipping holding device which is simplified in nature and which may be released by a reasonable effort.

A prime example of such a need is in the area of rotating, magnetic disk storage devices having removable disks. It is evident that holding devices therefor should be simplified in nature so as to be rendered relatively trouble free, inexpensive to construct and easy to operate. Additionally, since the removable disks are generally removed or replaced manually, the holding device should be releasable by a reasonable effort such as can be obtained manually.

A goal of such magnetic disk storage devices is the attainment of an extremely high concentration of data together with a high and constant data rate at which data is read from the disk. It is therefore necessary that the apparatus be constructed with precision, that precise alignment be maintained between magnetic read and write heads and associated tracks of the disk, that the rotational speed of the disks be maintained constant, and that runout be avoided. Therefore, it is desirable that a holding device for holding a removable disk to a rotating shaft absolutely avoid mechanical slap or slippage.

Mechanical slap or slippage causes a second problem which must be avoided. This is the generation of wear particles due to friction. These particles may be microscopic in size, but due to the concentration of data on the disk and the microscopic size of the data, the presence of such particles on or near the surface of a disk can cause numerous errors. Therefore, it is necessary that the holding means positively lock the disk against frictional movement so as to avoid the generation of wear particles.

Various types of holding means have been designed by prior practitioners in the art. However, these holding means have been of various mechanical locking types which are generally highly complex and which include various forms of mechanical latching action. Friction from the mechanical action of such mechanisms while locking or releasing causes the generation of wear particles which, as discussed above, can cause numerous errors. These devices are also relatively expensive to construct and not simple to operate. Therefore, it is desirable that a holding device for holding a removable disk to a rotating shaft operate without mechanical action while locking or releasing.

Therefore, it is an object of the present invention to provide a simplified holding means which prevents mechanical slippage or slap.

A further object of the present invention is to provide a simplified holding means which avoids mechanical action while locking or releasing.

A type of holding device that avoids mechanical action during latching or releasing is an electro-magnetic holding device. Holding means have been devised utilizing electro-magnets for various uses such as remotely controlled doors, but have not proven desirable for use with magnetic disk storage systems. One reason is that, as the electro-magnet is energized or released, an electromagnetic field is generated which tends to erase the recorded magnetic data. Another reason, and the primary problem preventing use of an electro-magnet with magnetic disk storage systems, is that the use of an electromagnet introduces a need for complex apparatus to allow for electrical connections to the rotating shaft on which the magnet is mounted.

A possible way of eliminating such a complexity is to utilize a permanent magnet. Magnetic holding means utilizing permanent magnets have been devised for various uses such as refrigerator doors, but have not been adapted for use with magnetic disk storage systems. This is because a continuous flux field emanating from the permanent magnet tends to erase the recorded magnetic data on the disk as the disk is brought near or withdrawn from the spindle on which the magnet is mounted.

Therefore, a still further object of the present invention is to provide a simplified magnetic holding means which so reduces emanating magnetic flux fields as to eliminate erasure of recorded magnetic data thereby.

Still another object of the present invention is to provide a magnetic holding means utilizing a permanent magnet which so reduces emanating magnetic flux fields as to eliminate erasure of recorded magnetic data thereby.

Thus, in accordance with an aspect of the present invention, there is provided a magnetic holding means for latching an object thereto comprising a magnetizing means, first and second pole faces, each associated with one pole of the magnetizing means, a magnetically permeable armature of the object through which magnetic flux from the magnetizing means flows by way of the pole faces when the object is in proper position, and an air gap in parallel with the pole faces which acts as a magnetic shunt, the air gap being longer than any gap between the pole faces and the magnetically permeable armature of the object when the armature is in place (in physical contact). The additional air gap acts as a magnetic shunt, and greatly reduces the magnetic force between the pole faces whenever the armature is not in physical contact therewith. In addition, the gap concentrates the magnetic flux field thereat so as to substantially reduce the emanating magnetic flux field from the first and second poles. Also, the air gap is physically displaced away from the object so that any movement of the object past the magnetic holding means will not cause erasure of data recorded thereon.

An additional problem comprises the need to accurately position the recording disk both horizontally and vertically with respect to the rotating shaft and to lock the disk in such proper alignment.

Accurate alignment could be attained by means of extremely high precision in machining of all mating parts. However, it is desirable to reduce the cost of the holding and aligning apparatus by reducing the number of precision machining operations.

Therefore, it is still another object of the present invention to provide simplified apparatus for accurately aligning an object and magnetically locking the object in the aligned position without generation of substantial magnetic fields.

Thus, in accordance with this aspect of the present invention there is provided a magnetic holding means as above, further including apparatus for accurately aligning the object with the holding means comprising a conical portion of the holding means, a corresponding aligning portion of the object having a conical hole therein, and a thin material interconnecting the aligning portion with the object, whereby flexural reaction of the material holds the object in alignment in a first direction with respect to the aligning portion and lateral deflection of the material allows lateral movement between the object and the aligning portion of the object so that the alignment of the object with respect to the holding means in the lateral direction is established solely by the armature and a pole face.

A feature of the present invention is that it provides a highly simplified, non-mechanical device for locking an object to a rotating shaft.

The foregoing and other objects, features and advantages of the invention will be apparent from the following more particular description of the preferred embodiment of the invention, as illustrated in the accompanying drawings.

Figure 3:
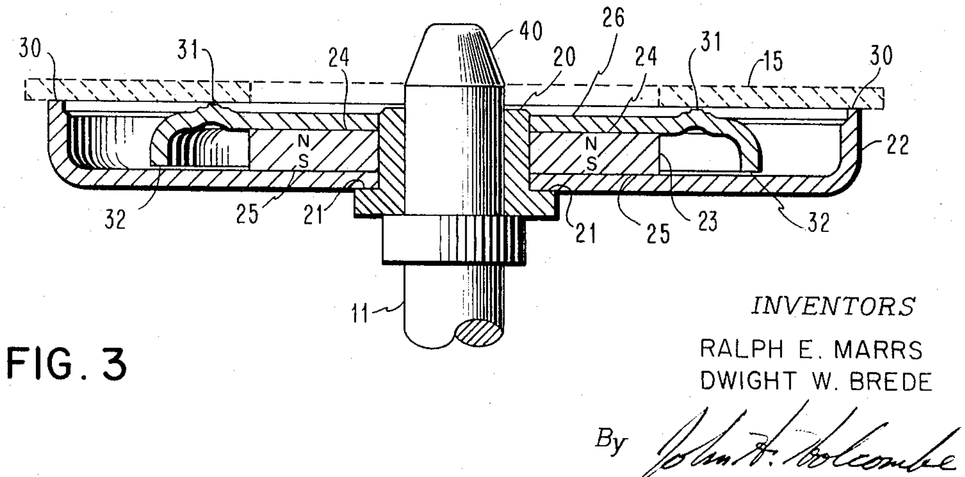

In the drawings:

FIGURE 1 comprises a plan view of a magnetic recording disk and holding means constructed in accordance with the present invention;

FIGURE 2 comprises a sectional view of the magnetic recording disk of FIGURE 1 taken along line A—A together with a corresponding view of the holding means shown in phantom; and FIGURE 3 comprises an enlarged sectional view of the holding means shown in phantom in FIGURE 2.

The present invention is directed towards a holding means which is simplified in nature, which may be released by a reasonable effort, which avoids slippage or mechanical slap, which avoids the frictional generation of wear particles from a mechanical locking action, and which accurately aligns a detachable object. To accomplish this a magnetic holding device is desirable but presents the problem erasure of magnetic data recorded on the detachable object.

The present invention overcomes the problem of erasure by means of a magnetic shunt which is physically displaced away from the object so that locking or release of the object or any movement of the object past the holding device will not cause erasure of data recorded thereon.

In an effort to simplify the magnetic holding means of the preferred embodiment of the invention, a permanent magnet is utilized as the magnetizing means. Alternatively, an electro-magnet may be utilized as the magnetizing means, but, as may be appreciated, the use of an electro-magnet introduces a need for complex apparatus to allow for electrical connections to the rotating shaft on which the magnet is mounted. Such complexity of course will not appear in situations where the system is stationary.

Referring now to the drawings for a more specific description of the preferred embodiment of the invention, and specifically referring to FIGURES 1 and 2, a magnetic disk 10 of conventional construction is to be aligned with and mounted on shaft 11 for rotation thereby.

An aligning support 12 is provided and a clamping piece 13 is mounted thereon by means of screws 14 so as to clamp magnetic disk 10 to support member 12. The support member 12, clamping piece 13 and screws 14 are all made of non-magnetic material, such as aluminum. An armature 15, comprising a magnetically permeable material is attached to support member 12 by means of rivets 16.

Thus, armature 15 is facing and permanently riveted to support member 12 so as to provide alignment therewith, and screws 14 are tightened such that clamping piece 13 locks disk 10 to support member 12 in horizontal and vertical alignment therewith.

Referring to FIGURE 2, and more particularly to FIGURE 3, the magnetic holding means of the present invention is shown mounted on shaft 11. A cylinder 20, having a flat alignment surface 21, is press-fit onto shaft 11. The alignment surface 21 is adapted to align the holding means so as to be exactly perpendicular to the axis of shaft 11. A cup-shaped pole piece 22, having a cylindrical hole in the center thereof, is press-fit over cylinder 20 such that the bottom surface thereof is braced by contact with alignment surface 21. This causes pole piece 22 to be aligned both axially with respect to shaft 11 and aligned perpendicular to shaft 11. Although a tolerable amount of runout of pole piece 22 is not critical, its vertical alignment with respect to shaft 11, both as to vertical position and as to its exact perpendicularity with respect to shaft 11, is critical since it comprises the vertical alignment means of disk 10 as will be explained hereinafter.

A toroidal permanent magnet 23 of rectangular cross section is cemented into place over cylinder 20 against the upper surface of pole face 22. The permanent magnet 23 is magnetized vertically such that its upper surface 24 comprises a north pole and its lower surface 25 comprises a south pole.

A second pole piece 26, also cup-shaped and having a hole in the center thereof, is press-fit over cylinder 20 such that its lower surface lies against north pole 24 of permanent magnet 23. Thus, when the described elements have been appropriately assembled and armature 15 is positioned as shown in phantom in FIGURE 3, pole piece 22 forms a south pole face 30 at the intersection therewith and pole piece 26 forms a north pole face on the circumferential portion 31 closest to the armature.

Pole face 31 is depressed slightly from pole face 30 so as to form a slight air gap between pole face 31 and armature 15. This is so that the vertical positioning of armature 15 is accomplished solely by pole face 30 as aligned by alignment face 21 of cylinder 20. With support member 12 aligned with and riveted to armature 15 and disk 10 clamped to support member 12 and aligned therewith, alignment of armature 15 by pole face 30 thereby properly aligns disk 10 vertically.

The horizontal alignment of disk 10 will be described hereinafter.

With pole face 31 of pole piece 26 concentrating the flux from permanent magnet 23 to form a north pole, and pole face 30 of pole piece 22 concentrating the magnetic flux so as to form a south magnetic pole, armature 15 is magnetically attracted thereby and held firmly in place with sufficient force along the entire contact area of pole face 30 such that the friction therebetween is sufficient to prevent mecanical slap or slippage during normal operations of the disk unit. Thus, magnetic disk 10 is locked to shaft 11 for rotation thereby magnetically without mechanical motion of any mechanical locking mechanism. The lack of frictional movement between pole face 30 and armature 15 together with the lack of mechanical action of a locking means avoids the hazardous and troublesome generation of wear particles by conventional apparatus.

The utilization of a permanent magnet 23 also avoids the complex apparatus required to allow electrical connections to an electro-magnet mounted on rotating shaft 11.

As previously stated, usage of a permanent magnet presents the problem of a continuous flux field which emanates from the permanent magnet and tends to erase magnetic data recorded on the detachable objects as the object is brought near or withdrawn from the spindle 11.

The present invention overcomes these problems and thereby allows the use of permanent magnets as locking means with magnetic recording disks by the addition of a shunting gap located away and substantially shielded from disk 10.

The cupped shape of pole piece 26 now becomes important since it forms a second pole face 32 adjacent the upper surface of pole piece 22, forming an air gap therebetween. This air gap is substantially longer (approximately ten times) than the air gap between pole face 31 and armature 15. Thus, when armature 15 is locked in place, almost all of the magnetic flux is concentrated at pole face 31 so as to hold armature 15 firmly in place.

As disk 10 is raised by means of the apparatus disclosed in co-pending application Serial No. 450,783, "Interchangeable Memory Component," Buslik et al., filed April 26, 1965, assigned to the common assignee with the present invention, the magnetic flux concentrated at pole faces 30 and 31 is gradually reduced since more of the flux is concentrated at pole face 32. As the average length of the gaps adjacent pole faces 30 and 31 becomes longer, a correspondingly greater percentage of the magnetic flux is concentrated at the air gap formed by pole face 32 since the gap remains at a constant length. By the time armature 15 has been raised sufficiently to clear spindle 11, practically all of the flux emanating from permanent magnet 23 is concentrated at pole face 32. Additionally, disk 10 is shielded by armature 15 from the magnetic field at pole face 32 as the flux thereat increases.

Since the magnetic flux field caused by permanent magnet 23 is concentrated at pole face 32, the disk 10, when raised, may be removed at will without danger of erasure.

Thus, the present invention has removed away from the vicinity of disk 10 the magnetic flux field created as the disk is mounted or withdrawn, has shielded the disk from the field during its creation, and has concentrated, after the disk has been raised, the continuously emanating magnetic flux field at pole face 32, away from disk 10, so as to prevent any erasure of the disk as the disk is brought near or withdrawn from the spindle 11.

Referring now to FIG. 2, the top most portion of spindle 11 has been given the shape of a truncated cone wherein the conical surface 40 comprises a precision-machined surface. A corresponding conical hole 41 has been precision machined in support member 12. The mating of these two surfaces provides the horizontal axial alignment of disk 10 with respect to shaft 11.

The aligning conical surface 41 of support member 12 is attached to the remaining portion of support member 12 by a thin, flexible portion 42 of support member 12.

Thus, as the disk pack unit comprising disk 10, support member 12 and armature 15 is brought into position with respect to shaft 11, aligning surface 41 first contacts corresponding conical surface 40, thereby axially positioning and aligning disk 10 therewith. The magnetic flux emanating from permanent magnet 23 by way of pole faces 30 and 31 magnetically attracts armature 15 into contact with pole face 30, thereby deflecting flexible member 42. The flexural reaction of member 42 maintains the proper axial alignment of disk 10 with respect to shaft 11, but the lateral flexibility of the member prevents aligning surface 41 from playing any part in the vertical alignment of disk 10.

As armature 15 contacts pole face 30, the pole face aligns armature 15, support member 12 and disk 10 vertically in the proper vertical position and exactly perpendicular to the axis of shaft 11.

The flexible portion 42 of support member 12 may alternatively comprise a plurality of elongaged flexible members of rectangular cross section disposed radially about surface 41. The use of the single continuous flexible member 12 is preferred because its manufacture comprises a much simpler machining operation.

The present invention therefore provides an additional air gap which acts as a magnetic shunt to greatly reduce the magnetic force between the armature and the pole faces whenever the armature is slightly out of physical contact with them. In addition, the shunting nature of the air gap reduces the flux field generated as the disk is mounted or withdrawn, and the armature itself shields the disk from such field. Further, the shunting gap is physically displaced away from disk 10 and concentrates the magnetic flux thereat when armature 15 is displaced from the pole faces 30 and 31 so that any movement of disk 10 past the permanent magnet 23 will not cause erasure of data recorded on disk 10. The invention has additionally provided a means for latching and accurately aligning a detachable member which is simplified in nature, relatively trouble free, inexpensive to construct, and easy to operate.

While the invention has been particularly shown and described with references to a preferred embodiment thereof, it will be understood by those skilled in the art that the foregoing and other changes in form and details may be made therein without departing from the spirit and scope of the invention.

We claim:

1. A magnetic holding means for holding a removable object thereto, said object including a magnetic recording medium, comprising:

a magnetizing means including north and south pole faces;

a magnetically permeable portion of said removable object through which magnetic flux from said magnetizing means flows by way of said pole faces when said object is in proper position so as to be magnetically attracted and held thereby;

an air gap physically displaced away from said object forming a magnetic circuit in parallel with said magnetically permeable portion of said object which thereby acts as a magnetic shunt, said air gap being longer than any gap between said pole faces and magnetically permeable portion of said object when said object is in said proper position; and alignment means comprising mating surfaces of said object and said holding means to align said object with respect to said holding means when said object is in said proper position, said mating surfaces being arranged to approximately maintain said alignment over a range of movement of said object such that said magnetically permeable portion of said object magnetically shields said magnetic recording medium from said air gap so long as said magnetic recording medium is in such proximity with said air gap that it would otherwise be adversely affected by the magnetic flux thereat.

2. Holding and aligning means for accurately aligning and magnetically holding an object comprising:

an armature comprising a magnetically permeable portion of said object;

a magnet;

a first pole piece contacting one pole of said magnet and having first and second pole faces, said first pole face lying adjacent said armature when said object is in proper position for holding;

a second pole piece contacting the other pole of said magnet and having first and second pole faces, said first pole face lying adjacent said armature when said object is in proper position for holding, thereby completing a magnetic circuit from said magnet through said first pole face of said first pole piece through said armature and through said first pole face of said second pole piece to said magnet, said second pole face lying adjacent said second pole face of said first pole piece to form a gap therebetween, said gap being physically displaced away from said object and said gap being longer than any gap between said first pole faces and said armature, thereby forming a magnetic shunt circuit from said magnet through said second pole face of said first pole piece and said second pole face of said second pole piece to said magnet so as to concentrate an increasing portion of magnetic flux in said shunt circuit as said object is removed from adjacent said first pole faces;

an extended portion of said holding means having a conical surface;

a corresponding hole in said object having a corresponding conical surface; and laterally flexible means interconnecting the portion of said object having said conical hole therein with the remainder of said object, whereby the flexural reaction of said flexible material maintains said object in alignment in a first direction with respect to said portion of said object and lateral deflection of said flexible material allows lateral movement between the portion of said object having said conical hole therein and the remainder of said object so that the alignment of said object with respect to said holding means in said lateral direction is established solely by the area of contact between the first pole face of one of said pole pieces and said armature.

3. Holding and aligning means for accurately aligning and magnetically holding an object comprising:

an armature comprising a magnetically permeable portion of said object;

a magnet;

a first pole piece contacting one pole of said magnet and having first and second pole faces, said first pole face lying adjacent said armature when said object is in proper position for holding;

a second pole piece contacting the other pole of said magnet and having first and second pole faces, said first pole face lying adjacent said armature when said object is in proper position for holding, thereby completing a magnetic circuit from said magnet through said first pole face of said first pole piece through said armature and through said first pole face of said second pole piece to said magnet, said second pole face lying adjacent said second pole face of said first pole piece to form a gap therebetween, said gap being physically displaced away from said object and said gap being longer than any gap between said first pole faces and said armature, thereby forming a magnetic shunt circuit from said magnet through said second pole face of said first pole piece and said second pole face of said second pole piece to said magnet so as to concentrate an increasing portion of magnetic flux in said shunt circuit as said object is removed from adjacent said first pole faces;

an extended portion of said holding means having a surface in the form of a truncated cone;

an aligning portion of said object having a hole therein corresponding to said extended portion of said holding means and having a corresponding conical surface; and laterally flexible means interconnecting said aligning portion of said object with the remainder of said object, whereby the flexural reaction of said flexible material maintains said object in alignment in a first direction with respect to said aligning portion of said object and whereby lateral deflection of said flexible material allows lateral movement between said aligning portion of said object and said remainder of said object so that said alignment of said object with respect to said holding means in said lateral direction is established solely by the area of contact between said first pole face of the one of said pole pieces contacting said armature.

4. Holding and aligning means for accurately aligning and magnetically holding an object comprising:

an armature comprising a magnetically permeable portion of said object;

a magnet;

a first pole piece contacting one pole of said magnet and having first and second pole faces, said first pole face lying adjacent said armature when said object is in proper position for holding;

a second pole piece contacting the other pole of said magnet and having first and second pole faces, said first pole face lying adjacent said armature when said object is in proper position for holding, thereby completing a magnetic circuit from said magnet through said first pole face of said first pole piece through said armature and through said first pole face of said second pole piece to said magnet, said second pole face lying adjacent said second pole face of said first pole piece to form a gap therebetween, said gap being physically displaced away from said object and said gap being longer than any gap between said first pole faces and said armature, thereby forming a magnetic shunt circuit from said magnet through said second pole face of said first pole piece and said second pole face of said second pole piece to said magnet so as to concentrate an increasing portion of magnetic flux in said shunt circuit as said object is removed from adjacent said first pole faces;

an extended portion of said holding means;

an aligning portion of said object having a surface for mating with said extended portion of said holding means; and laterally flexible means interconnecting said aligning portion of said object with the remainder of said object, whereby the flexural reaction of said flexible material maintains said object in alignment in a first direction with respect to said aligning portion of said object and whereby lateral deflection of said flexible material allows lateral movement between said aligning portion of said object and said remainder of said object so that the alignment of said object with respect to said holding means in said lateral direction is established solely by the area of contact between said first pole face of the one of said pole pieces contacting said armature.

5. The holding and aligning means of claim 4 wherein:

said object includes a magnetic recording medium; and said extended portion of said holding means and said aligning portion of said object are arranged to approximately maintain said alignment over a range of movement of said object such that said armature acts as a magnetic shield between said gap in said shunt circuit and said magnetic recording medium so long as said magnetic recording medium is in such proximity with said gap that it would otherwise be adversely affected by the magnetic flux thereat.

References Cited by the Examiner

UNITED STATES PATENTS

| | | | |
|---|---|---|---|
| 2,698,917 | 1/1955 | VanUrk et al. | 317—201 |
| 2,792,249 | 5/1957 | Saxton | 317—159 |
| 3,095,525 | 6/1963 | Hansen | 317—201 |
| 3,204,155 | 8/1965 | Charpentier | 317—171 |

BERNARD A. GILHEANY, *Primary Examiner.*

H. A. LEWITTER, *Assistant Examiner.*